United States Patent
Matsumura et al.

(10) Patent No.: US 7,794,883 B2
(45) Date of Patent: Sep. 14, 2010

(54) NONAQUEOUS ELECTROLYTE SECONDARY BATTERY

(75) Inventors: Naoki Matsumura, Kashiwara (JP); Emiko Igaki, Amagasaki (JP); Motoi Kawamura, Kadoma (JP); Masashi Shoji, Osaka (JP); Miyuki Nakai, Osaka (JP)

(73) Assignee: Panasonic Corporation, Osaka (JP)

( * ) Notice: Subject to any disclaimer, the term of this patent is extended or adjusted under 35 U.S.C. 154(b) by 1191 days.

(21) Appl. No.: 10/575,319

(22) PCT Filed: Feb. 8, 2005

(86) PCT No.: PCT/JP2005/001797
§ 371 (c)(1),
(2), (4) Date: Apr. 11, 2006

(87) PCT Pub. No.: WO2005/076392
PCT Pub. Date: Aug. 18, 2005

(65) Prior Publication Data
US 2008/0248385 A1 Oct. 9, 2008

(30) Foreign Application Priority Data
Feb. 9, 2004 (JP) .............................. 2004-031755

(51) Int. Cl.
*H01M 4/72* (2006.01)
*H01M 4/66* (2006.01)

(52) U.S. Cl. ...................................... 429/234; 429/245

(58) Field of Classification Search .................. None
See application file for complete search history.

(56) References Cited

U.S. PATENT DOCUMENTS

| 4,469,395 | A | * | 9/1984 | Bennett ....................... 439/894 |
| 5,597,665 | A | * | 1/1997 | Harada et al. ................ 429/235 |
| 6,001,139 | A | * | 12/1999 | Asanuma et al. ........... 29/623.3 |
| 7,459,234 | B2 | * | 12/2008 | Berkowitz et al. .......... 429/178 |

FOREIGN PATENT DOCUMENTS

| EP | 0 851 525 | 7/1998 |
| JP | 1-99574 | 4/1989 |
| JP | 10-199574 | 4/1989 |
| JP | 8-170126 | 7/1996 |
| JP | 2001-135352 | * 5/2001 |

* cited by examiner

*Primary Examiner*—Melvin C Mayes
*Assistant Examiner*—Smita Patel
(74) *Attorney, Agent, or Firm*—Hamre, Schumann, Mueller & Larson, P.C.

(57) ABSTRACT

A nonaqueous electrolyte secondary battery of the present invention includes a nonaqueous electrolyte and a positive electrode 13 that occludes lithium ions reversibly. The positive electrode 13 includes active material layers 13b and a sheet-like collector 13a that supports the active material layers 13b. The collector 13a contains aluminum and at least one element other than aluminum. The average composition that is obtained by averaging the ratio of the elements composing the collector 13a in the direction of the thickness of the collector 13a is equal to the composition of an alloy whose liquidus temperature is 630° C. or lower. The present invention makes it possible to prevent heat from being generated due to an internal short circuit in the nonaqueous electrolyte secondary battery.

20 Claims, 3 Drawing Sheets

NONAQUEOUS ELECTROLYTE SECONDARY BATTERY

TECHNICAL FIELD

The present invention relates to a nonaqueous electrolyte secondary battery.

BACKGROUND ART

Recently, with the development of portable electronic devices such as notebook-sized personal computers, cellular phones, etc., there is a need for high-density and high-capacity secondary batteries. Typical secondary batteries that have been used are nonaqueous electrolyte secondary batteries in which lithium cobaltate is used for a positive electrode active material while a carbon-based material is used for a negative electrode active material.

There is a need for further increases in density and capacity of batteries, which, however, can result in the possibility of heat generation. For instance, when an internal short circuit is caused through the breakage of a battery due to the misuse thereof, the penetration of a metal body, etc., the battery that has an increased density and capacity is expected to generate heat. When an internal short circuit occurs, electrons flow through the short-circuited part locally to generate Joule heat. This heat causes a separator to shrink and thereby the area of the short-circuited part between the positive electrode and the negative electrode expands. Further, the positive electrode active material that has melted due to the Joule heat comes into contact with the negative electrode and thereby oxygen contained in the positive electrode active material causes an oxidation reaction with active lithium contained in the negative electrode active material. This may result in abrupt heat generation. Such abrupt heat generation actually can occur in batteries having an increased density and capacity. In order to solve this problem, a nonaqueous secondary battery has been proposed that includes a collector whose surfaces have increased electric resistance (JP10 (1998)-199574A). This secondary battery includes a resistive layer that is formed on each surface of a positive electrode or negative electrode collector and that has a higher resistance than that of the collector.

The increase in resistance of the collector surface, however, results in an increase in internal resistance of the battery and thereby has adverse effects on the characteristics such as the battery capacity, operating voltage, cycle characteristics, etc. Accordingly, there is a demand for new nonaqueous electrolyte secondary batteries that can prevent abrupt heat generation from being caused when an internal short circuit occurs, without impairing the battery characteristics.

DISCLOSURE OF INVENTION

With such issues in mind, the present invention is intended to provide a new nonaqueous electrolyte secondary battery that can prevent abrupt heat generation from being caused even when an internal short circuit occurs.

In order to achieve the above-mentioned object, the nonaqueous electrolyte secondary battery of the present invention includes a nonaqueous electrolyte and a positive electrode that occludes lithium ions reversibly. The positive electrode includes an active material layer and a sheet-like collector that supports the active material layer. The collector contains aluminum and at least one element other than aluminum. The average composition that is obtained by averaging the ratio of the elements composing the collector in the direction of the thickness of the collector is equal to the composition of an alloy whose liquidus temperature is 630° C. or lower. In this context, the liquidus temperature denotes the temperature at which a change from a liquid phase into a solid phase starts occurring.

In the nonaqueous electrolyte secondary battery of the present invention, when an internal short circuit occurs and thereby heat is generated, a liquid phase portion comes out of the positive electrode collector earlier than the positive electrode mixture does in the part where the internal short circuit has occurred. Accordingly, the collector shrinks. This allows, for instance, the collector to be separated from the short-circuited point to resolve the internal short circuit. As a result, abrupt heat generation can be prevented from being caused through the internal short circuit. Thus a safer battery can be obtained.

DESCRIPTION OF THE INVENTION

The following description is directed to an example of the embodiment according to the present invention.

The nonaqueous electrolyte secondary battery of the present invention includes a nonaqueous electrolyte and a positive electrode that occludes lithium ions reversibly. The positive electrode includes an active material layer and a sheet-like collector that supports the active material layer. The collector contains aluminum and at least one element other than aluminum. The average composition that is obtained by averaging the ratio of the elements composing the collector in the direction of the thickness of the collector is equal to the composition of an alloy whose liquidus temperature is 630° C. or lower. That is, the weight ratio of the elements composing the collector that supports the active material layer is equal to that of the elements composing the alloy whose liquidus temperature is 630° C. or lower. The nonaqueous electrolyte secondary battery of the present invention also includes other components such as a negative electrode, a separator, etc. in addition to the positive electrode and the nonaqueous electrolyte.

The thickness of the collector is not particularly limited but is, for instance, in the range of 5 μm to 40 μm and generally in the range of 10 μm to 40 μm.

The above-mentioned at least one element to be used herein can be, for instance, magnesium, silicon, tin, copper, zinc, and germanium. Examples of the combination of the elements composing the average composition include Al—Si, Al—Mg, Al—Si—Mg, etc.

In the secondary battery of the present invention, the collector may include a layer formed of an alloy of aluminum and the at least one element. For example, it may include a layer formed of an alloy such as an aluminum-magnesium alloy, an aluminum-silicon alloy, etc.

In the secondary battery of the present invention, the collector may include a layer containing the at least one element and aluminum layers disposed on both sides of the layer. The layer containing the at least one element may be the layer formed of the at least one element (for instance, a silicon layer or a magnesium layer) or a layer formed of an alloy of aluminum and the at least one element (hereinafter, the same holds true).

In the secondary battery of the present invention, the collector may include an aluminum sheet and a plurality of island regions dispersed in the sheet. In this case, the island regions contain the at least one element. The mean diameter of the island regions is 2 μm or smaller, for example.

In the secondary battery of the present invention, the collector may include an aluminum layer (an aluminum sheet) and layers containing the at least one element disposed on both sides thereof. In this case, an aluminum layer further may be formed on the surface.

In the secondary battery of the present invention, the at least one element may be at least one element selected from magnesium and silicon. Magnesium and silicon are preferable since they satisfy a wide range of characteristics (in content) that are required for the collector of the present invention.

In the secondary battery of the present invention, the content of the magnesium may be in the range of 5.5 to 96.0 wt. % in the above-mentioned average composition. In the case of the aluminum-magnesium alloy, the content of the magnesium set in the above-mentioned range allows the liquidus temperature to be 630° C. or lower. A preferable amount of the magnesium contained in this collector is in the range of 9.0 to 92.5 wt. %.

In the secondary battery of the present invention, the content of the silicon may be in the range of 5.1 to 16.3 wt. % in the above-mentioned average composition. In the case of the aluminum-silicon alloy, the content of the silicon set in the above-mentioned range allows the liquidus temperature to be 630° C. or lower. A preferable amount of the silicon contained in this collector is in the range of 8.0 to 15.0 wt. %.

In the secondary battery of the present invention, the total of the contents of aluminum, magnesium, and silicon may be at least 99.5 wt. % in the average composition.

The melting point of aluminum is about 660° C. while that of magnesium is about 649° C. The melting points of these elements are higher than the liquidus temperature of the Al—Mg alloy. Accordingly, the effect of the present invention cannot be obtained when those elements are located completely separately with respect to each other. However, when the regions of those elements are located to be adjacent to each other, characteristics similar to those of the alloy are exhibited at the interface between the two regions. Hence, when an aluminum layer and a thin layer of another element are disposed to be adjacent to each other or when island regions of another element are formed in aluminum, characteristics similar to those of the alloy are exhibited due to the effect of the interface. Conceivably, since the collector of the positive electrode to be used in the present invention has the same average composition as the composition of an alloy whose liquidus temperature is 630° C. or lower, the collector starts melting considerably earlier than aluminum (whose melting point is about 660° C.) does.

In the secondary battery of the present invention, a surface of the collector may be formed of aluminum. Generally, the surface of the aluminum layer disposed on the surface of the collector is oxidized to be aluminum oxide. This aluminum oxide prevents the collector from eluting during charging and discharging.

In the secondary battery of the present invention, a protective layer may be formed on a surface of the collector. This protective layer can prevent the collector from eluting during charging and discharging. This protective layer may be an oxide layer. Examples of the oxide layer include aluminum oxide, etc. Furthermore, the protective layer may be provided with a liquid-repellent property. When a protective layer having a property of repelling a nonaqueous electrolyte is formed on the surface of the collector, the nonaqueous electrolyte can be prevented from coming into direct contact with the collector. This can prevents the collector from eluting during charging and discharging.

Generally, the collector formed of aluminum includes a naturally oxidized film at each surface thereof. Accordingly, the aluminum does not elute during charging and discharging. However, when the collector is formed of a mixture or alloy of aluminum and another metallic element, the naturally oxidized film may tend not to be formed at the surface depending on the type and mixture ratio of the elements. Even in such a case, when a protective layer is formed on the surface of the collector, the collector can be obtained that has high durability for charge and discharge.

In the secondary battery of the present invention, it is preferable that the above-mentioned average composition be equal to the composition of an alloy whose liquidus temperature is between 250° C. and 630° C. The liquidus temperature of the average composition of the collector is required to be higher than the temperature to which the battery may be exposed during normal use. From this viewpoint, with consideration given to various conditions that the battery may encounter, such as a condition where the battery is dropped accidentally into boiling water, when suitable allowance is provided additionally, it is preferable that the average composition be equal to the composition of an alloy whose liquidus temperature is 250° C. or higher.

In the nonaqueous electrolyte secondary battery, in order to prevent the battery characteristics from deteriorating due to the increase in battery temperature that is caused when an internal short circuit occurs, it is preferable that the surface temperature of the battery not exceed 150° C. when an internal short circuit occurs, with consideration given to the heat stability test according to Underwriters Laboratories Standard (UL1642) in the United States.

The method of manufacturing the collector to be used in the present invention is not particularly limited. The collector can be formed using a well-known method. For instance, it may be formed by a method in which aluminum and another element (for example, silicon and/or magnesium) are mixed together at a predetermined ratio and then the mixture is melted. Furthermore, it may be formed by a method in which islands made of another element are studded on the surface of aluminum foil by, for instance, a vapor deposition method and then aluminum further is deposited thereon. It also may be formed by a method in which an aluminum layer and a layer made of another element are formed on the surface of aluminum foil by, for instance, the vapor deposition method. In addition, it may be formed by a method in which a layer made of another element is interposed between two sheets of aluminum foil.

Suitable embodiments of the present invention are described below with reference to the drawings. With respect to an example of the nonaqueous electrolyte secondary battery of the present invention, a partially exploded cross-sectional view thereof is shown schematically in FIG. 1.

Figure 1:
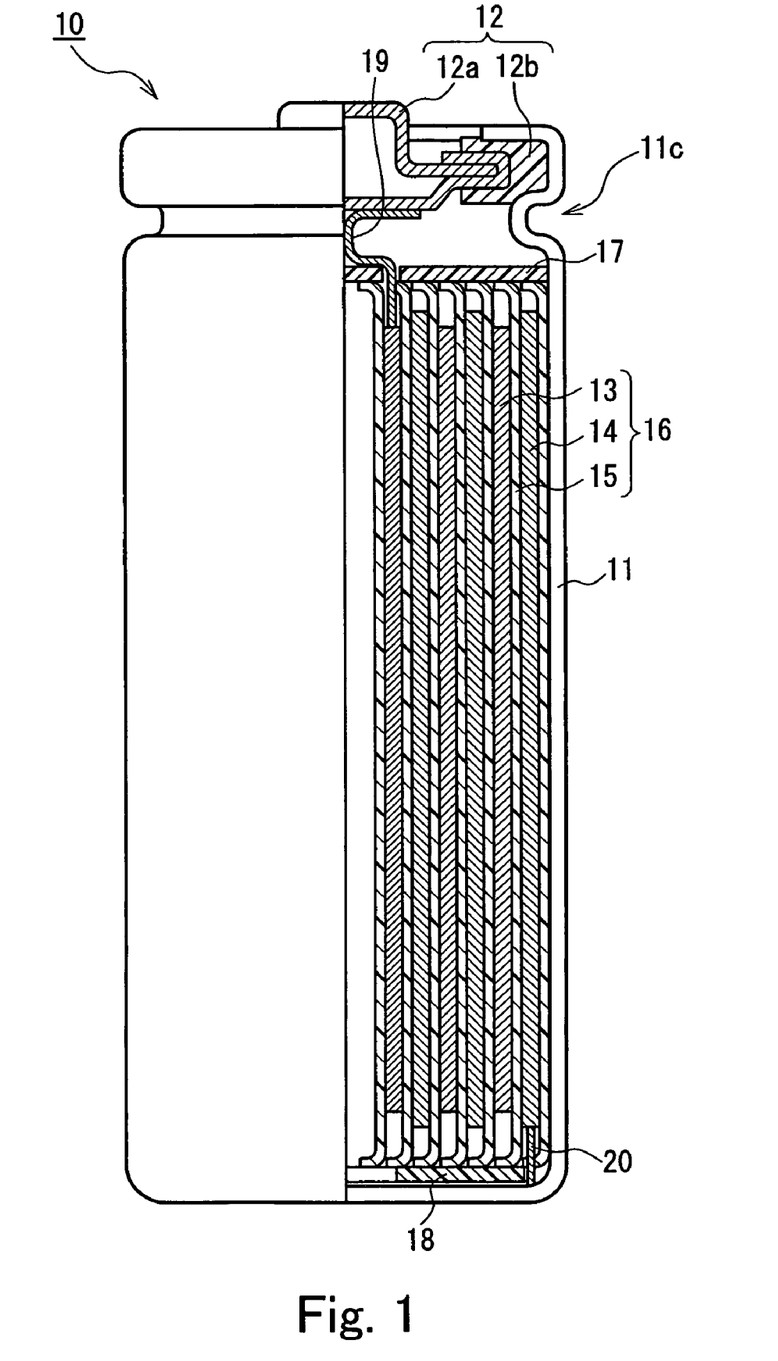
FIG. 1 is a partially exploded cross-sectional view that schematically shows an example of the nonaqueous electrolyte secondary battery of the present invention.

The nonaqueous electrolyte secondary battery 10 shown in FIG. 1 is provided with a case 11 (hatching is omitted) that serves as a negative electrode terminal, a sealing member 12 that seals the case 11, and a positive electrode 13, a negative electrode 14, a separator 15, and a nonaqueous electrolyte (not shown in FIG. 1) that are housed in the case 11. The sealing member 12 includes a positive electrode cover 12a and a gasket 12b. The positive electrode 13 and the negative electrode 14 each contain an active material that occludes and emits lithium ions reversibly. The positive electrode 13 and the negative electrode 14 are wound spirally, with the separator 15 being sandwiched therebetween, which forms an electrode group 16. Insulating plates 17 and 18 for preventing the occurrence of a short circuit are disposed over and under the electrode group 16. The positive electrode 13 is connected to the sealing member 12 through a lead 19. The negative electrode 14 is connected to the case 11 through a lead 20.

Figure 2:
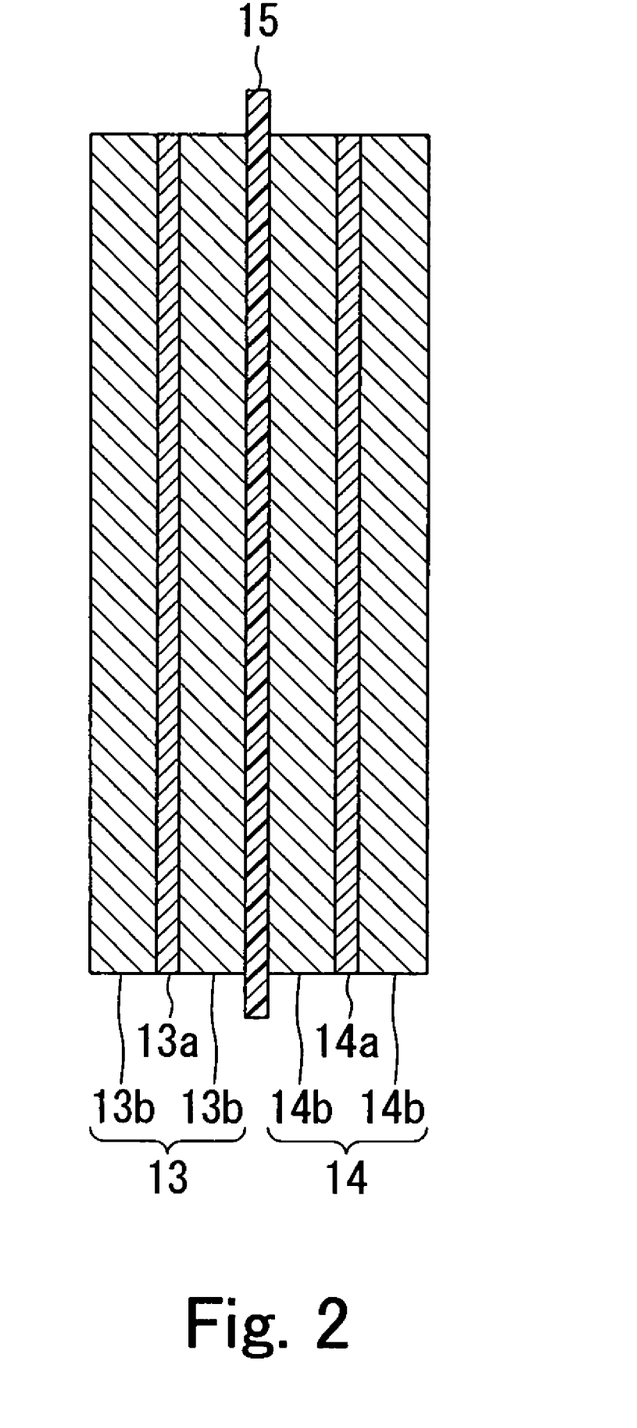
FIG. 2 is a cross-sectional view that schematically shows an example of the arrangement of a positive electrode, a separator, and a negative electrode.

FIG. 2 schematically shows a cross-sectional view of a part of the electrode group 16. The positive electrode 13 includes a collector 13a and active material layers 13b disposed on both the surfaces of the collector 13a. The active material layers 13b are layers containing a positive electrode active material. The negative electrode 14 includes a collector 14a and active material layers 14b disposed on both the surfaces of the collector 14a. The active material layers 14b are layers containing a negative electrode active material.

The collector 13a shown in FIG. 2 supports the active material layers 13b by the whole surfaces thereof. However, the collector of the present invention that supports the active material layers may be a part of the collector including a part that supports the active material layers and a part that does not support them. At least the part of the collector that supports the active material layers (the part to which the active material layers are attached) has an average composition that is in the above-mentioned range. The part that does not support the active material layers (the part to which the active material layers are not attached) may have the same average composition. Generally, the configuration of the cross-section of the collector 13a is substantially the same throughout the collector 13a. The weight ratio of the respective elements composing the collector 13a is equal to that of the respective elements of the average composition.

The collector 13a of the positive electrode has the above-mentioned configuration and average composition. Examples of the collector containing aluminum and an element other than aluminum include a collector formed using an alloy of aluminum and another element, a collector containing another element dispersed in aluminum foil, a collector including aluminum foil whose surface is covered with a layer of another element, and a collector including a layer of another element interposed between two aluminum layers. FIGS. 3A to 3E show cross-sectional views of examples of the configuration of such a collector 13a.

Figure 3A:
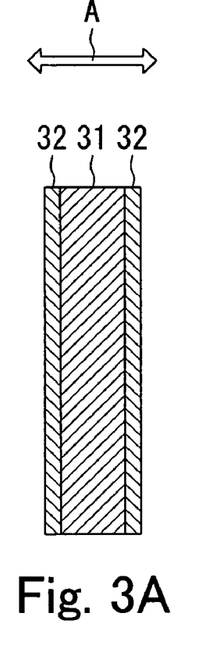
FIGS. 3A to 3E are cross-sectional views that schematically show examples of the collector of the present invention.

The collector shown in FIG. 3A includes a layer 31 formed of an alloy of aluminum and an element other than aluminum, and aluminum layers 32 disposed on both sides of the layer 31. The layer 31 is formed of, for instance, an aluminum-silicon alloy. The collector shown in FIG. 3A can be produced by forming the aluminum layers 32 on both sides of the alloy sheet (the layer 31) by the vapor deposition method or the like.

Figure 3B:
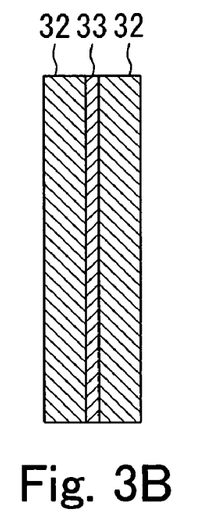

The collector shown in FIG. 3B includes a layer 33 containing an element other than aluminum and aluminum layers 32 disposed on both sides thereof. The layer 33 is formed of, for instance, silicon or an aluminum alloy. The aluminum alloy is an aluminum-silicon alloy, for example. The collector shown in FIG. 3B has a structure of an aluminum layer/a silicon layer/an aluminum layer, for example. The collector shown in FIG. 3B can be produced by, for instance, forming the layer 33 and an aluminum layer 32 on an aluminum sheet (an aluminum layer 32) by the vapor deposition method or the like.

Figure 3C:
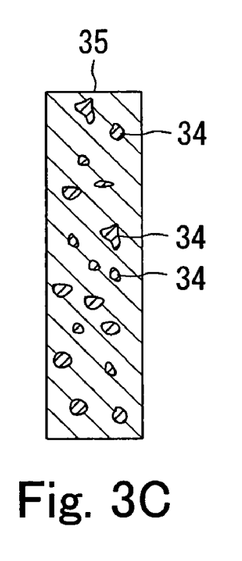

The collector shown in FIG. 3C is an aluminum sheet 35 including island regions 34. The island regions 34 are formed of silicon or an aluminum-silicon alloy, for example. The collector shown in FIG. 3C can be formed by, for instance, first depositing an element other than aluminum in the form of islands on an aluminum sheet, then depositing aluminum, and further repeating these depositions alternately.

Figure 3D:
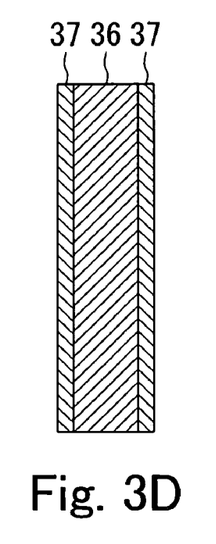
Figure 3E:
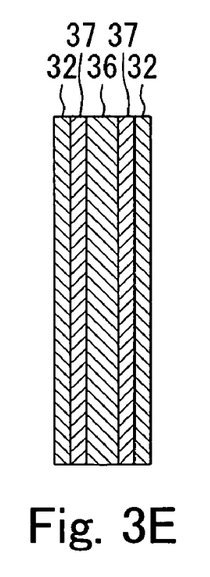

The collector shown in FIG. 3D includes an aluminum sheet 36 and layers 37 disposed on both sides thereof. The layers 37 contain an element other than aluminum and are formed of, for instance, silicon or an aluminum-silicon alloy. As shown in FIG. 3E, it is preferable that the collector further include aluminum layers 32 disposed on the outer sides of the layers 37. An example of the collector shown in FIG. 3E has a structure of an aluminum layer/a silicon layer/an aluminum sheet/a silicon layer/an aluminum layer. The collectors shown in FIGS. 3D and 3E are preferable in that they are easy to produce. Furthermore, in these collectors, since the aluminum sheet that has a high electrical conductivity is disposed in the middle thereof, the internal resistance is reduced.

The thickness of the aluminum sheet 36 is, for instance, in the range of 5 μm to 20 μm. The thickness of the layers 37 is selected according to the content of the element other than aluminum and the target average composition. The thickness of the layers 37 is, for example, 30 μm or less while the thickness of the aluminum layers 32 is, for example, 20 μm or less.

As described above, the average composition that is calculated by averaging the constituent elements of such a collector in the direction of the thickness of the collector (i.e. the direction A shown in FIG. 3A) is a composition whose liquidus temperature is 630° C. or lower. For instance, in the case of a collector having a structure of an aluminum layer/a silicon layer/an aluminum sheet/a silicon layer/an aluminum layer, the weight ratio of aluminum:silicon that is obtained by summing the weights of the respective elements in the direction of the thickness of the collector is in the range of 94.9:5.1 to 83.7:16.3.

The descriptions of the collectors shown in FIGS. 3A to 3E were directed mainly to the cases where silicon or an aluminum-silicon alloy was used as the material of the collector. However, a part or the whole of silicon may be replaced by another element such as magnesium, for example.

A layer with a liquid-repellent property may be formed on a surface of the collector 13a. The layer with a liquid-repellent property is not particularly limited but may be a layer containing macromolecules having a low affinity for a nonaqueous electrolyte. For instance, a layer may be employed that is formed of macromolecules of at least one selected from the group consisting of perfluoroalkyl ester of polyacrylic acid, a fluorine-based silane compound, a fluorine-based coating material, polybutadiene, and pitch.

In the nonaqueous electrolyte secondary battery of the present invention, the same configurations and materials as those employed in conventional nonaqueous electrolyte secondary batteries can be used for the parts other than the collector of the positive electrode. For example, a can made of stainless steel can be used for the case 11. The positive electrode active material layers 13b can be formed of a mixture containing an active material such as lithium cobaltate and an electrically conductive auxiliary such as acetylene black, for example. For instance, copper foil can be used for the negative electrode collector 14a. The negative electrode active material layers 14b can be formed of a mixture containing a carbon-based material that can intercalate/deintercalate lithium reversibly, for example.

The nonaqueous electrolyte to be used herein can be, for instance, one obtained by dissolving $LiPF_6$ (lithium hexafluorophosphate) in a mixed organic solvent of ethylene carbonate (EC), diethyl carbonate (DEC), and n-methylpyrrolidone (MP). The electrolyte, however, is not limited to this but can be an electrolyte that can be obtained by dissolving lithium salt in an organic solvent. The organic solvent is not particularly limited. For instance, ethylene carbonate, ethyl methyl carbonate, dimethyl carbonate, n-methylpyrrolidone, etc. can be used individually or a mixture of two or more of them can be used.

A microporous film made of polyolefin can be used for the separator, for example. Specifically, a microporous film made of polyethylene or polypropylene can be used.

The nonaqueous electrolyte secondary battery of the present invention is provided with a positive electrode collector having the same average composition as the composition that melts at temperatures of 630° C. or lower. Accordingly, when an internal short circuit occurs and thereby heat is generated, the corresponding part of the collector melts to shrink and thereby the internal short circuit is resolved. Hence, the present invention makes it possible to prevent heat from being generated when an internal short circuit occurs. Since the collector melts due to heat generated when an internal short circuit occurs before the mixture of the positive electrode melts, the internal short circuit is resolved before the mixture of the positive electrode melts.

EXAMPLES

Next, the present invention is described further in detail using examples. The present invention, however, is not limited to the following examples. In the examples, cylindrical lithium secondary batteries (with a diameter of 18 mm and a height of 65 mm) having the configuration shown in FIG. 1 were produced. Subsequently, a nail was pierced into each battery and then the temperature of the battery surface was measured in the vicinity of the part where the nail had been pierced.

Example 1

Positive Electrode

A magnesium layer (with a thickness of about 0.45 μm) was formed on each surface of aluminum foil (with a thickness of about 8 μm) by vacuum deposition and then an aluminum layer was formed thereon by the vacuum deposition. Thus a collector was produced that had a structure of an aluminum layer/a magnesium layer/aluminum foil/a magnesium layer/aluminum layer. In this collector, the content of magnesium was 5.5 wt. % in the average composition of the part with which the active material layer was in contact. An Al—Mg alloy (containing 5.5 wt. % of Mg) corresponding to the average composition has a liquidus temperature of about 630° C.

Further, $Li_2CO_3$ and $Co_3O_4$ were mixed together, which then was baked at 900° C. for 10 hours. Thus $LiCoO_2$ powder was synthesized. This $LiCoO_2$ powder, 2.7 weight parts of acetylene black, and 6.3 weight parts of fluororesin-based binder were mixed together and thereby a mixture of 100 weight parts was obtained. This mixture was mixed with a carboxymethyl cellulose aqueous solution and thereby a slurry was prepared. This slurry was applied to both the surfaces of the collector and then was dried, which then was rolled and thereby a positive plate (with a thickness of 0.18 mm, a width of 37 mm, and a length of 500 mm) was obtained.

Negative Electrode

First, mesophase small spheres were graphitized at 2800° C. and thereby an active material (mesophase graphite) was produced. A mixture of 100 weight parts of mesophase graphite and 3 weight parts of styrene-butadiene rubber was mixed with a carboxymethyl cellulose aqueous solution. Thus a slurry was prepared. This slurry was applied to both the surfaces of copper foil (with a thickness of 0.02 mm) and then was dried, which then was rolled and thereby a negative plate (with a thickness of 0.20 mm, a width of 39 mm, and a length of 500 mm) was obtained.

Production of Battery

Next, an aluminum lead and a nickel lead were attached to the positive plate and the negative plate, respectively. These positive plate and negative plate were wound spirally, with a polypropylene separator (with a thickness of 0.025 mm, a width of 45 mm, and a length of 1000 mm) being interposed therebetween. Thus, an electrode group was formed. This electrode group was placed in a case (with a diameter of 18 mm and a height of 650 mm) together with an electrolyte. The electrolyte was prepared by dissolving $LiPF_6$ in a solvent so that the concentration thereof was 1 mol/l. The solvent was obtained by mixing EC, DEC, and MP at a volume ratio of 30:50:20. Finally, the case was sealed and thereby a battery of Example 1 was obtained.

This cylindrical battery was charged until the battery voltage reached 4.2 V. A test (a nail piercing test) in which a nail was pierced through the center portion of the battery in the direction of the diameter of the cylindrical can was carried out in an environment whose temperature was 25° C. In this case, the nail speed was set at 5 mm per second. The surface temperature of the battery can was measured directly after the nail was pierced.

Example 2

In Example 2, a positive electrode collector was produced by the same method as in Example 1 except that the content of magnesium was 10.0 wt. % in the average composition of the collector. The liquidus temperature of an Al—Mg alloy (containing 10.0 wt. % of Mg) corresponding to the average composition is about 605° C. Using this collector, a battery was produced that had the same configuration as that of Example 1. Then the nail piercing test was carried out by the same method as in Example 1.

Example 3

In Example 3, a positive electrode collector was produced by the same method as in Example 1 except that the content of magnesium was 20.0 wt. % in the average composition of the collector. The liquidus temperature of an Al—Mg alloy (containing 20.0 wt. % of Mg) corresponding to the average composition is about 556° C. Using this collector, a battery was produced that had the same configuration as that of Example 1. Then the nail piercing test was carried out by the same method as in Example 1.

Example 4

In Example 4, a positive electrode collector was produced by the same method as in Example 1 except that the content of magnesium was 50.0 wt. % in the average composition of the collector. The liquidus temperature of an Al—Mg alloy (containing 50.0 wt. % of Mg) corresponding to the average composition is about 456° C. Using this collector, a battery was produced that had the same configuration as that of Example 1. Then the nail piercing test was carried out by the same method as in Example 1.

Example 5

In Example 5, an aluminum layer (with a thickness of 0.4 μm) was deposited on each surface of a magnesium sheet (with a thickness of 30 μm) and thereby a positive electrode collector was produced. The content of magnesium was 96 wt. % in the average composition of this collector. The liquidus temperature of an Al—Mg alloy (containing 96 wt. % of Mg) corresponding to the average composition is about 630° C. Using this collector, a battery was produced that had the same configuration as that of Example 1. Then the nail piercing test was carried out by the same method as in Example 1.

Example 6

In Example 6, a positive electrode collector (an aluminum layer/a silicon layer/aluminum foil/a silicon layer/an aluminum layer) was produced by the same method as in Example 1 except that the silicon layers were used instead of the magnesium layers and the content of silicon was 5.1 wt. % in the average composition of the collector. The liquidus temperature of an Al—Si alloy (containing 5.1 wt. % of Si) corresponding to the average composition is about 630° C. Using this collector, a battery was produced that had the same configuration as that of Example 1. Then the nail piercing test was carried out by the same method as in Example 1.

Example 7

In Example 7, a positive electrode collector was produced by the same method as in Example 6 except that the content of silicon was 12.6 wt. % in the average composition of the collector. The liquidus temperature of an Al—Si alloy (containing 12.6 wt. % of Si) corresponding to the average composition is about 577° C. Using this collector, a battery was produced that had the same configuration as that of Example 1. Then the nail piercing test was carried out by the same method as in Example 1.

Example 8

In Example 8, a positive electrode collector was produced by the same method as in Example 6 except that the content of silicon was 15 wt. % in the average composition of the collector. The liquidus temperature of an Al—Si alloy (containing 15 wt. % of Si) corresponding to the average composition is about 610° C. Using this collector, a battery was produced that had the same configuration as that of Example 1. Then the nail piercing test was carried out by the same method as in Example 1.

Example 9

In Example 9, a positive electrode collector was produced by the same method as in Example 6 except that the content of silicon was 16.3 wt. % in the average composition of the collector. The liquidus temperature of an Al—Si alloy (containing 16.3 wt. % of Si) corresponding to the average composition is about 630° C. Using this collector, a battery was produced that had the same configuration as that of Example 1. Then the nail piercing test was carried out by the same method as in Example 1.

Comparative Example 1

A cylindrical secondary battery was produced as Comparative Example 1. The secondary battery had the same configuration as that of Example 1 except that the positive electrode collector was formed of aluminum alone. Then the nail piercing test was carried out by the same method as in Example 1. The liquidus temperature (the melting point) of aluminum is 660° C.

Comparative Example 2

In Comparative Example 2, a positive electrode collector was produced by the same method as in Example 1 except that the content of magnesium was 1 wt. % in the average composition of the collector. The liquidus temperature of an Al—Mg alloy (containing 1 wt. % of Mg) corresponding to the average composition is about 654° C. Using this collector, a battery was produced that had the same configuration as that of Example 1. Then the nail piercing test was carried out by the same method as in Example 1.

Comparative Example 3

In Comparative Example 3, a positive electrode collector was produced by the same method as in Example 1 except that the content of magnesium was 3.1 wt. % in the average composition of the collector. The liquidus temperature of an Al—Mg alloy (containing 3.1 wt. % of Mg) corresponding to the average composition is about 640° C. Using this collector, a battery was produced that had the same configuration as that of Example 1. Then the nail piercing test was carried out by the same method as in Example 1.

Comparative Example 4

In Comparative Example 4, a positive electrode collector was produced by the same method as in Example 5 except that the content of magnesium was 98 wt. % in the average composition of the collector. The liquidus temperature of an Al—Mg alloy (containing 98 wt. % of Mg) corresponding to the average composition is about 640° C. Using this collector, a battery was produced that had the same configuration as that of Example 1. Then the nail piercing test was carried out by the same method as in Example 1.

Comparative Example 5

In Comparative Example 5, a positive electrode collector was produced by the same method as in Example 6 except that the content of silicon was 1 wt. % in the average composition of the collector. The liquidus temperature of an Al—Si alloy (containing 1 wt. % of Si) corresponding to the average composition is about 652° C. Using this collector, a battery was produced that had the same configuration as that of Example 1. Then the nail piercing test was carried out by the same method as in Example 1.

Comparative Example 6

In Comparative Example 6, a positive electrode collector was produced by the same method as in Example 6 except that the content of silicon was 3.5 wt. % in the average composition of the collector. The liquidus temperature of an Al—Si alloy (containing 3.5 wt. % of Si) corresponding to the average composition is about 640° C. Using this collector, a battery was produced that had the same configuration as that of Example 1. Then the nail piercing test was carried out by the same method as in Example 1.

Comparative Example 7

In Comparative Example 7, a positive electrode collector was produced by the same method as in Example 6 except that the content of silicon was 17.0 wt. % in the average composition of the collector. The liquidus temperature of an Al—Si alloy (containing 17 wt. % of Si) corresponding to the average composition is about 640° C. Using this collector, a battery was produced that had the same configuration as that of Example 1. Then the nail piercing test was carried out by the same method as in Example 1.

Table 1 shows the test results of the respective Examples and Comparative Examples.

TABLE 1

| | Positive Electrode Collector | | | Surface Temperature of |
|---|---|---|---|---|
| | Mg Content (wt. %) | Si Content (wt. %) | Liquidus Temperature (° C.) | Battery after Nail Piercing (° C.) |
| Comparative Example 1 | — | — | 660 (Al:100%) | At least 160° C. |
| Comparative Example 2 | 1 | — | 654 | 158 |
| Comparative Example 3 | 3.1 | — | 640 | 156 |
| Example 1 | 5.5 | — | 630 | 146 |
| Example 2 | 10 | — | 605 | 137 |
| Example 3 | 20 | — | 556 | 118 |
| Example 4 | 50 | — | 456 | 110 |
| Example 5 | 96 | — | 630 | 144 |
| Comparative Example 4 | 98 | — | 640 | 157 |
| Comparative Example 5 | — | 1 | 652 | 158 |
| Comparative Example 6 | — | 3.5 | 640 | 153 |
| Example 6 | — | 5.1 | 630 | 142 |
| Example 7 | — | 12.6 | 577 | 113 |
| Example 8 | — | 15.0 | 610 | 132 |
| Example 9 | — | 16.3 | 630 | 144 |
| Comparative Example 7 | — | 17.0 | 640 | 154 |

In the batteries of Examples 1 to 9, the surface temperature of each battery can was lower than 150° C. and the temperature fell with the passage of time. On the other hand, in the batteries of Comparative Examples 1 to 7, the surface temperature of each battery can was higher than 150° C. Furthermore, in some of the batteries of Comparative Examples 1 to 7, the surface temperature did not fall with the passage of time.

Conceivably, in each battery of the examples, the positive electrode collector melted much earlier than the mixture of the positive electrode did during the rise in temperature of the battery and thereby the collector was separated from the short-circuited part. Accordingly, it is conceivable that in each battery of the examples, melting of the mixture of the positive electrode that might cause excessive heat generation was prevented from occurring during the nail piercing test.

INDUSTRIAL APPLICABILITY

The nonaqueous electrolyte secondary battery of the present invention is applicable to various uses, for instance, portable electronic devices such as notebook-sized personal computers, cellular phones, etc.

The invention claimed is:

1. A nonaqueous electrolyte secondary battery comprising:
a nonaqueous electrolyte and a positive electrode that occludes lithium ions reversibly,
wherein the positive electrode comprises an active material layer and a sheet-like collector that supports the active material layer,
the collector comprises a first layer containing at least one element other than aluminum, and a second layer and a third layer both consisting essentially of aluminum,
the second layer and the third layer being disposed on opposed sides of the first layer, and
an average composition that is obtained by averaging a ratio of elements composing the collector in a direction of thickness of the collector is equal to a composition of an alloy whose liquidus temperature is 630° C. or lower.

2. The nonaqueous electrolyte secondary battery according to claim 1, wherein the at least one element is at least one element selected from the group consisting of magnesium and silicon.

3. The nonaqueous electrolyte secondary battery according to claim 2, wherein a content of the magnesium is in a range of 5.5 to 96.0 wt. % in the average composition.

4. The nonaqueous electrolyte secondary battery according to claim 2, wherein a content of the silicon is in a range of 5.1 to 16.3 wt. % in the average composition.

5. The nonaqueous electrolyte secondary battery according to claim 2, wherein a total content of the aluminum, the magnesium, and the silicon is at least 99.5 wt. % in the average composition.

6. The nonaqueous electrolyte secondary battery according to claim 1, wherein the collector has surfaces formed by the second layer and third layer.

7. The nonaqueous electrolyte secondary battery according to claim 1, wherein a protective layer is formed on a surface of the collector.

8. The nonaqueous electrolyte secondary battery according to claim 7, wherein the protective layer is an oxide layer.

9. The nonaqueous electrolyte secondary battery according to claim 7, wherein the protective layer has a liquid-repellent property.

10. The nonaqueous electrolyte secondary battery according to claim 1, wherein the average composition is equal to a composition of an alloy whose liquidus temperature is between 250° C. and 630° C.

11. A nonaqueous electrolyte secondary battery comprising:
a nonaqueous electrolyte and a positive electrode that occludes lithium ions reversibly,
wherein the positive electrode comprises an active material layer and a sheet-like collector that supports the active material layer,
the collector comprises an aluminum sheet consisting essentially of the aluminum and a plurality of island regions dispersed in the aluminum sheet, and
the island regions contain at least one element other than aluminum, and
an average composition that is obtained by averaging a ratio of elements composing the collector in a direction of thickness of the collector is equal to a composition of an alloy whose liquidus temperature is 630° C. or lower.

12. The nonaqueous electrolyte secondary battery according to claim 11, wherein the at least one element is at least one element selected from the group consisting of magnesium and silicon.

13. The nonaqueous electrolyte secondary battery according to claim 12, wherein a content of the magnesium is in a range of 5.5 to 96.0 wt. % in the average composition.

14. The nonaqueous electrolyte secondary battery according to claim 12, wherein a content of the silicon is in a range of 5.1 to 16.3 wt. % in the average composition.

15. The nonaqueous electrolyte secondary battery according to claim 12, wherein a total content of the aluminum, the magnesium, and the silicon is at least 99.5 wt. % in the average composition.

16. The nonaqueous electrolyte secondary battery according to claim 11, wherein the collector has a surface formed of the aluminum.

17. The nonaqueous electrolyte secondary battery according to claim 11, wherein a protective layer is formed on a surface of the collector.

18. The nonaqueous electrolyte secondary battery according to claim 17, wherein the protective layer is an oxide layer.

19. The nonaqueous electrolyte secondary battery according to claim 17, wherein the protective layer has a liquid-repellent property.

20. The nonaqueous electrolyte secondary battery according to claim 11, wherein the average composition is equal to a composition of an alloy whose liquidus temperature is between 250° C. and 630° C.

* * * * *